United States Patent
Bolik et al.

(10) Patent No.: US 6,988,179 B2
(45) Date of Patent: Jan. 17, 2006

(54) METHOD, SYSTEM, AND PROGRAM FOR ORDERING OF PHYSICAL EXTENTS

(75) Inventors: Christian Bolik, Oldenburg (DE); Alexei Kojenov, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 10/410,415

(22) Filed: Apr. 7, 2003

(65) Prior Publication Data

US 2004/0199744 A1 Oct. 7, 2004

(51) Int. Cl.
*G06F 12/10* (2006.01)

(52) U.S. Cl. .................................................. 711/202
(58) Field of Classification Search ................ 711/161, 711/162, 202; 707/204
See application file for complete search history.

(56) References Cited

U.S. PATENT DOCUMENTS

| | | | |
|---|---|---|---|
| 5,944,789 A | 8/1999 | Tzelnic et al. | |
| 6,366,987 B1 | 4/2002 | Tzelnic et al. | |
| 6,650,656 B2 * | 11/2003 | Tyndall | 370/470 |
| 6,704,809 B2 * | 3/2004 | Tyndall | 710/5 |
| 6,804,690 B1 * | 10/2004 | Dysert et al. | 707/204 |
| 6,832,330 B1 * | 12/2004 | Boudrie et al. | 714/6 |
| 2002/0029319 A1 | 3/2002 | Peloquin et al. | |
| 2002/0073242 A1 | 6/2002 | Peloquin et al. | |

* cited by examiner

*Primary Examiner*—Kevin L. Ellis
(74) *Attorney, Agent, or Firm*—Taraki K. Davda; Konrad, Raynes & Victor LLP (57) ABSTRACT

Disclosed is a method, system, and program for ordering data. Portions of a logical volume are matched with portions of one or more physical extents. The one or more physical extents are ordered according to the order of the matched portions of the logical volume.

30 Claims, 9 Drawing Sheets

METHOD, SYSTEM, AND PROGRAM FOR ORDERING OF PHYSICAL EXTENTS

BACKGROUND OF THE INVENTION

1. Field of the Invention

The present invention is related to ordering of physical extents.

2. Description of the Related Art

Storage Area Networks (SANs) may be used for server-free backup. With server-free backup, when data is to be backed up (e.g., from a client computer to a server computer), the actual data transfer is performed by a data mover device (i.e., hardware) in the Storage Area Network, which could be, for example, a FibreChannel/SCSI gateway. The data mover receives instructions about which data to copy through physical Small Computer System Interface (SCSI) addresses, consisting of pairs of SCSI offsets and lengths. The SCSI offsets are expressed as logical block addresses (LBAs), but are "physical" from the perspective of a client computer.

In contrast, logical offsets are used, for example, by file systems, and start at offset zero for a given logical volume. The logical offsets are mapped at the client computer to the corresponding "physical" addresses, expressed in logical block addresses, which start at offset zero for a given physical disk, which may contain many logical volumes. While the logical blocks used by a given logical volume are always consecutive, their physical mapping may not be. For example, a spanned volume is one that consists of several physical parts (called "extents" herein) on potentially multiple physical disks that are not contiguous. In the case of a spanned volume, a single consecutive logical extent comprising multiple logical blocks may map to multiple non-contiguous physical extents. Logical extents and physical extents are blocks of data in logical and physical volumes, respectively.

This creates a problem for server-free backup because the physical extents copied by the data mover should be copied in logical order, so that the backed up image can be restored to volumes having a different physical layout. For example, a logical volume with extent offset 0 and length 100 may map to a first physical extent (i.e., extent 1) and a second physical extent (i.e., extent 2), with the first physical extent having an offset of 300 and a length of 40 and the second physical extent having an offset of 200 and a length of 60.

A backup application at the client computer needs to ensure that the physical extents are backed up in logical order, in this case, the first physical extent and then the second physical extent, even if the backup application does not receive physical extents for a given logical volume in this order (e.g., from an Application Programming Interface (API) of the operating system). If the physical extents are backed up in logical order, the backed up data can be restored to a physical volume with, for example, the following physical layout: physical extent 1 with offset 10 and length 10; physical extent 2 with offset 100 and length 80; and, physical extent 3 with offset 40 and length 10.

Thus, there is a need for a technique for determining the correct logical order of the physical extents.

SUMMARY OF THE INVENTION

Provided are a method, system, and program for ordering data. Portions of a logical volume are matched with portions of one or more physical extents. The one or more physical extents are ordered according to the order of the matched portions of the logical volume. In certain implementations of the invention, the logical volume comprises a single logical extent. In certain additional implementations of the invention, the logical volume comprises a plurality of logical extents.

Thus, the described implementations of the invention provide a method, system, and program for logically ordering physical extents.

BRIEF DESCRIPTION OF THE DRAWINGS

Referring now to the drawings in which like reference numbers represent corresponding parts throughout.

DETAILED DESCRIPTION

Figure 1A:
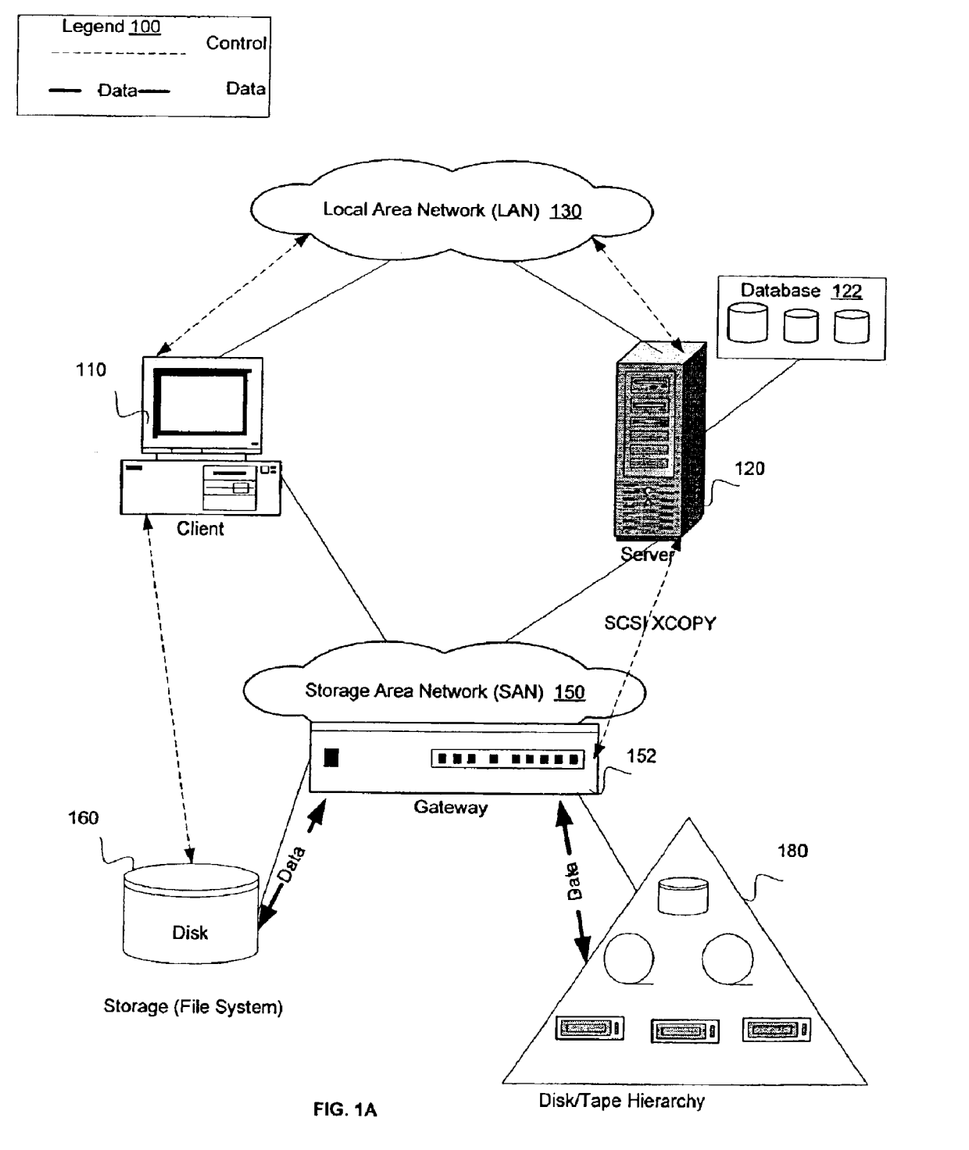
FIGS. 1A–1B illustrate, in block diagrams, a computing environment in accordance with certain implementations of the invention.
Figure 1B:
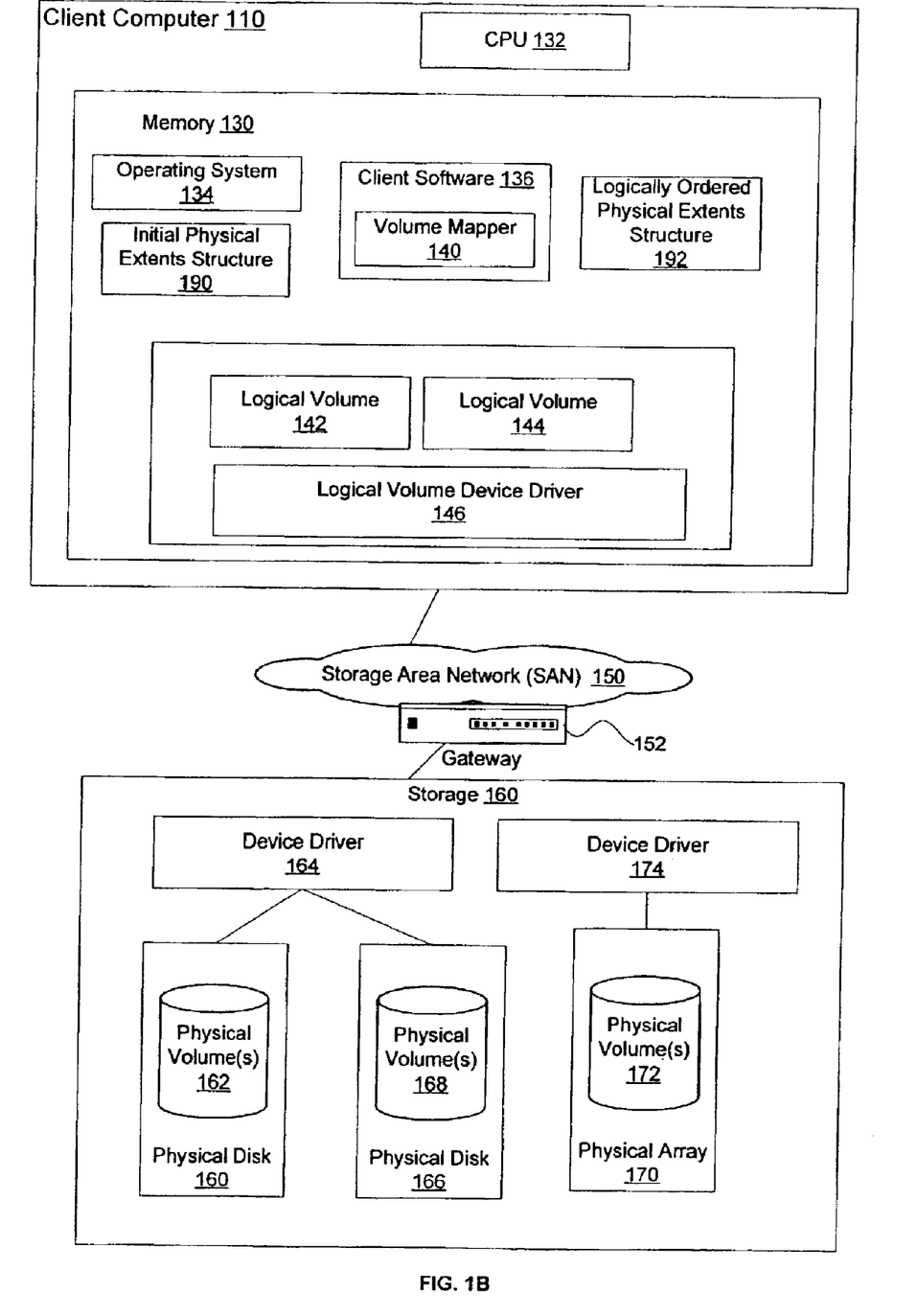

In the following description, reference is made to the accompanying drawings which form a part hereof and which illustrate several implementations of the present invention. It is understood that other implementations may be utilized and structural and operational changes may be made without departing from the scope of the present invention FIGS. 1A–1B illustrate, in block diagrams, a computing environment in accordance with certain implementations of the invention. In FIG. 1A, legend 100 indicates how control and data lines are shown. A client computer 110 includes client software (not shown), includes an operating system (not shown), and includes a volume mapper (not shown). The volume mapper may be embedded in client software or run as a stand-alone entity. The client computer 110 is connected to a server computer 120 via a local area network (LAN) 130 or other type of network (e.g., a wide area network (WAN) or the Internet). The server computer 120 includes a database 122.

The client computer 110 is connected via a Storage Area Network (SAN 150) to storage 160 (e.g., disks or a Redundant Array of Independent Disks (RAID) that may be used, for example, to store files). Also, a gateway 152 is used to move data between the SAN 150 and the SAN-attached storage 160 and the disk/tape hierarchy 180.

When the client software requests backup of data on SAN-attached storage 160, the client software retrieves a corresponding list of physical extents from the operating system at the client computer 110 and orders the list of physical extents using the volume mapper in ascending logical order using implementations of the invention. These ordered physical extents are then transformed, for example, into a SCSI XCOPY command and submitted to, for example, a SAN gateway, which performs the copy operation.

FIG. 1B illustrates further details of a computing environment. The client computer 110 includes memory 130 and a central processing unit 132. The central processing unit 132 executes an operating system 134 and client software 136 in memory 130. In certain implementations of the invention, the volume mapper 140 is embedded in the client software 136. In certain implementations of the invention, the volume mapper 140 is a stand-alone entity (e.g., software, firmware, hardware, or some combination).

The volume mapper 140 maps logical volumes 142 and 144 to physical volumes 162, 168, and 172. One or more physical volumes 162, 168 reside on physical disks 160, 166, respectively, which are connected to device driver 164. One or more physical volume(s) 172 reside on physical array 170 (e.g., a RAID device), which is connected to device driver 174. The device drivers 164, 174 interface with the logical volume device driver 146. In certain implementations of the invention, an initial physical extents structure 190 and a logically ordered physical extents structure 192 are used during the mapping process. The initial physical extents structure 190 stores indicators (e.g., pointers) to physical extents. The logically ordered physical extents structure 192 stores indicators (e.g., pointers) to physical extents so that the indicators may be used to logically order the physical extents. For example, the logically ordered physical extents structure 192 may be a list with pointers, and the first entry in the list would have a pointer to the physical extent that should be first in a set of logically ordered physical extents. Likewise, the second entry in the list would have a pointer to the physical extent that should be second in a set of logically ordered physical extents.

Figure 2A:
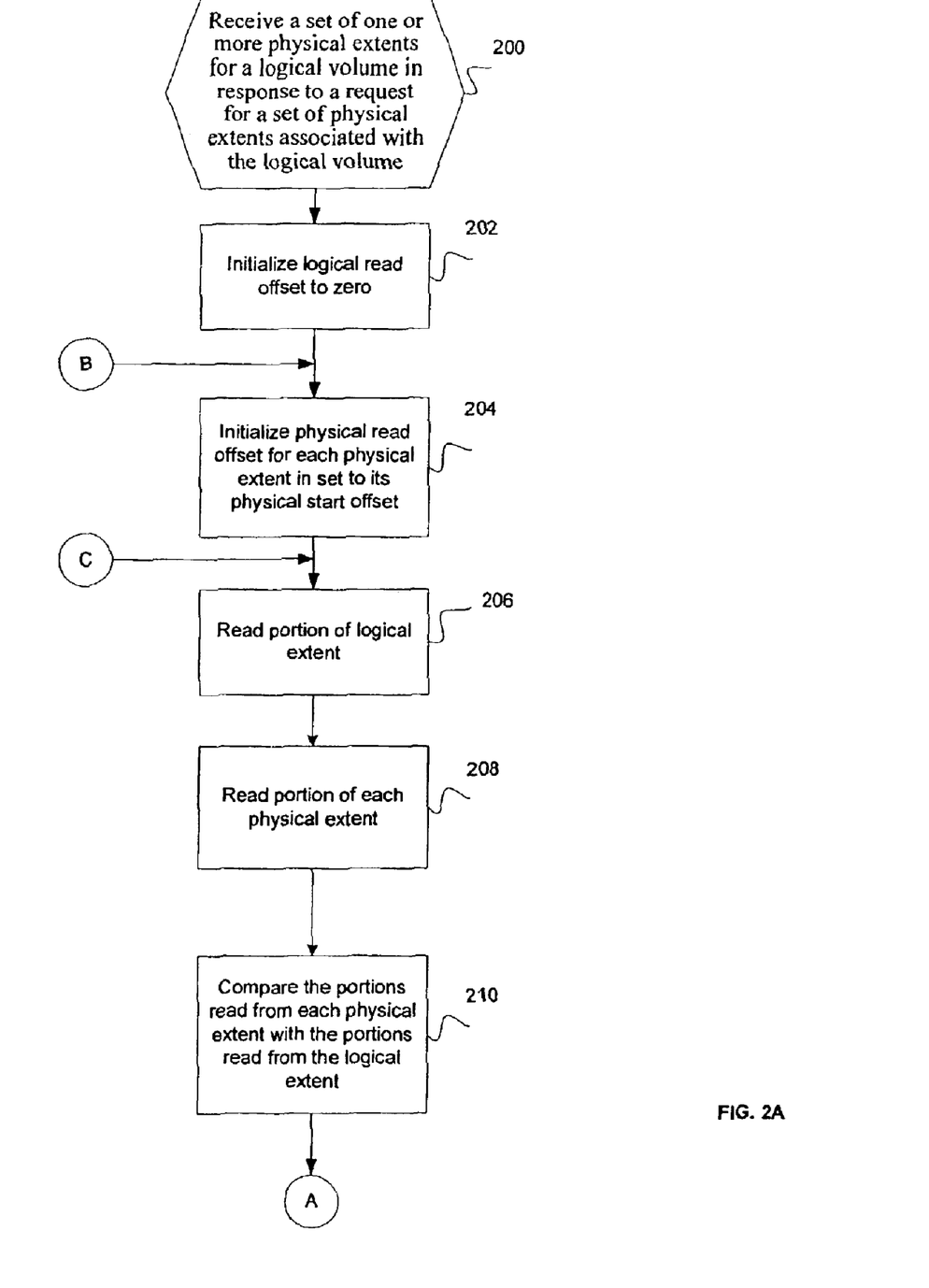
FIGS. 2A–2B illustrate logic implemented in a volume mapper to order one or more physical extents mapped to a single logical extent in accordance with certain implementations of the invention.
Figure 2B:
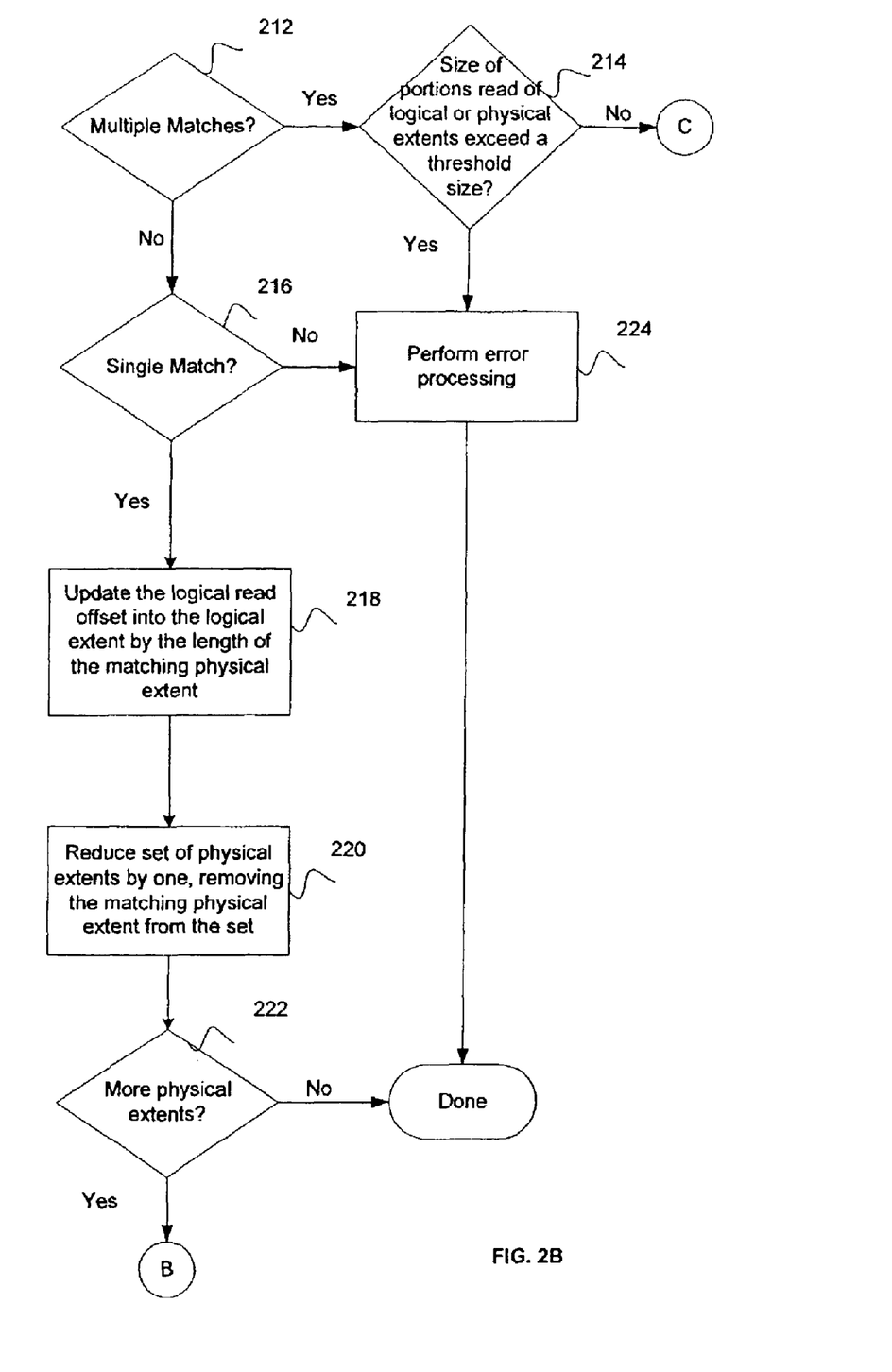

FIGS. 2A–2B illustrate logic implemented in a volume mapper 140 to order one or more physical extents mapped to a single logical extent in accordance with certain implementations of the invention. That is, in implementations of the invention described with respect to FIG. 2, a logical volume comprises a single logical extent. Control begins at block 200 with the volume mapper 140 receiving a set of one or more physical extents for a logical volume in response to a request to the operating system 134 for the set of physical extents associated with the logical volume. In certain implementations of the invention, an initial physical extents structure 190 is used to store indicators to the physical extents in the order in which the physical extents were retrieved.

In block 202, the volume mapper 140 initializes a logical read offset for the logical extent to zero. In certain implementations of the invention, the volume mapper 140 sets a pointer or equivalent means to point to or access the first byte of the logical extent. In block 204, the volume mapper 140 initializes a physical read offset for each physical extent in the set of physical extents to its physical start offset. In certain implementations of the invention, the volume mapper 140 sets additional pointers or equivalent means to point to or access the first byte of each physical extent, respectively.

In block 206, the volume mapper 140 reads a portion (e.g., n bytes, where n represents an integer) of the logical extent. In block 208, the volume mapper 140 reads a portion (e.g., n bytes, where n represents an integer) of each physical extent. In block 210, the volume mapper 140 compares the portions read from each physical extent to the portion read from the logical extent. For example, if there are three physical extents, the volume mapper 140 reads a portion of each of the three physical extents, and compares these three portions to the portion read from the logical extent. The volume mapper 140 determines whether there are multiple matches (block 212). That is, the volume mapper 140 determines whether the read portion of the logical extent matches more than one of the read portions of the physical extents. If there are multiple matches, processing continues to block 214, otherwise, processing continues to block 216.

In block 214, the volume mapper 140 determines whether the size of the read portions of the logical or physical extents exceeds a threshold size. Although the portion may be measured in various ways, in certain implementations of the invention, the portion is measured by bytes, and the threshold is set to a number of bytes less than the maximum length of each physical extent. If the size of the portions does not exceed the threshold size, processing continues to block 206. If the size of the portions exceeds the threshold size, then the physical extents cannot be ordered and a server free backup cannot be performed. In this situation, processing continues to block 224.

In block 224, error processing is performed. In certain implementations of the invention, if a unique order of the physical extents cannot be determined by the volume mapper 140, then a backup of the logical volume may be performed using different backup techniques (such as, LAN-free or LAN-based backup).

In block 216, the volume mapper 140 determines whether a single match has been found based on the comparison of the portions of each physical extent with the portion of the logical volume (in block 210). If so, processing continues to block 218. If it is determined in block 216 that a single match does not exist, then the physical extents cannot be ordered and a server free backup cannot be performed. In this situation, the processing continues to block 224, where a backup of the logical volume may be performed using different backup techniques (such as, LAN-free or LAN-based backup).

Thus, processing loops through blocks 204 through 210, starting at the location at which the last read operation stopped, until there is a single match, the size of the portion to be compared exceeds the threshold size, or it is determined that there are no matches.

If there is a single match, the volume mapper 140 updates the logical read offset into the logical extent by the length of the matching physical extent (block 218). The volume mapper reduces the set of physical extents by one by removing the matching physical extent from the set of physical extents (block 220). In certain implementations of the invention, an indicator is added to a logically ordered physical extents structure 192 in the next available entry in the structure 192 representing the order of the matched physical extent. In block 222, the volume mapper 140 determines whether there are any additional physical extents. If so processing returns to block 204, otherwise, processing is complete and the physical extents have been mapped to portions of the logical volume and put into logically ascending order using, for example, the logically ordered physical extents structure 192.

Figure 3:
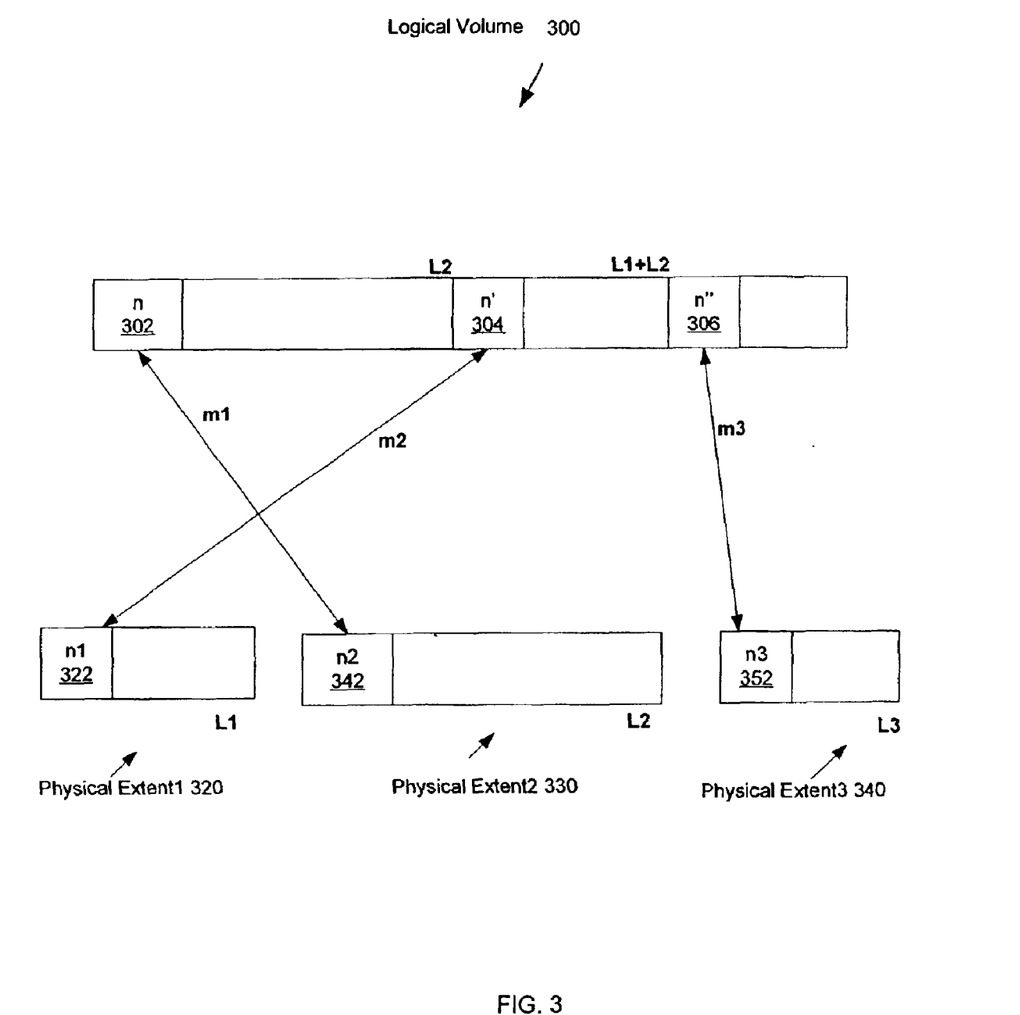
FIG. 3 illustrates a single logical extent and multiple physical extents in accordance with certain implementations of the invention.

FIG. 3 illustrates a single logical extent and multiple physical extents in accordance with certain implementations of the invention. In FIG. 3, the logical volume 300 comprises a single logical extent, and the multiple physical extents are physical extent 1 320, physical extent 2 330, and physical extent 3 340. The physical extents 320, 330, 340 are ordered to reflect the correct mapping to the single logical extent.

In FIG. 3, the sizes of portions read from the logical volume 300 in the first, second, and third iterations of processing in blocks 204–222 of FIGS. 2A–2B are represented with n 302, n' 304, and n" 306, respectively. The sizes of portions read from each of the physical extents 320, 330, 340 are represented with n1 322, n2 342, and n3 352, respectively. The length of each physical extent 320, 330, 340 is represented with L1, L2, and L3, respectively. The lines marked m1, m2, and m3 represent matches between portions of a logical volume 300 and each physical extent 320, 330, 340 in the first, second, and third iterations of processing in blocks 204–222 of FIGS. 2A–2B.

For example, in the first iteration, a portion of size n 302 is read from the logical volume 300 and is found to match physical extent 2 330. In the second iteration, a portion of size n' 304 is read from the logical volume 300 and is found to match physical extent 1 320. In the third iteration, a portion of size n" 306 is read from the logical volume 306 and is found to match physical extent 3 340. The ordering of the physical extents returned by the volume mapper 140 is: physical extent 2 330, physical extent 1 320, and physical extent 3 340. Thus, the physical extents 320, 340, 330 are logically ordered.

Figure 4A:
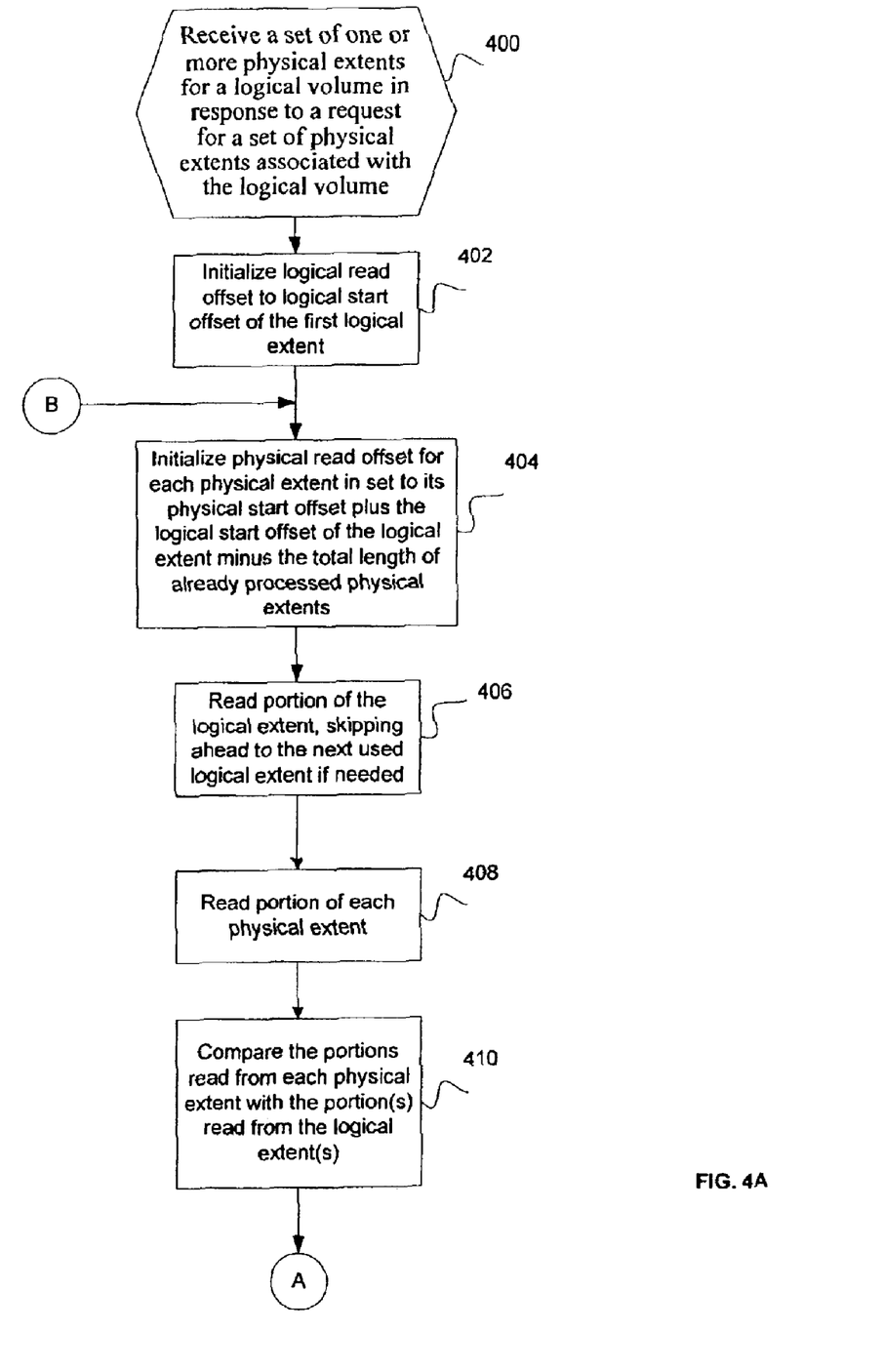
FIGS. 4A–4B illustrate logic implemented in the volume mapper to order physical extents mapped to multiple logical extents in accordance with certain implementations of the invention.
Figure 4B:
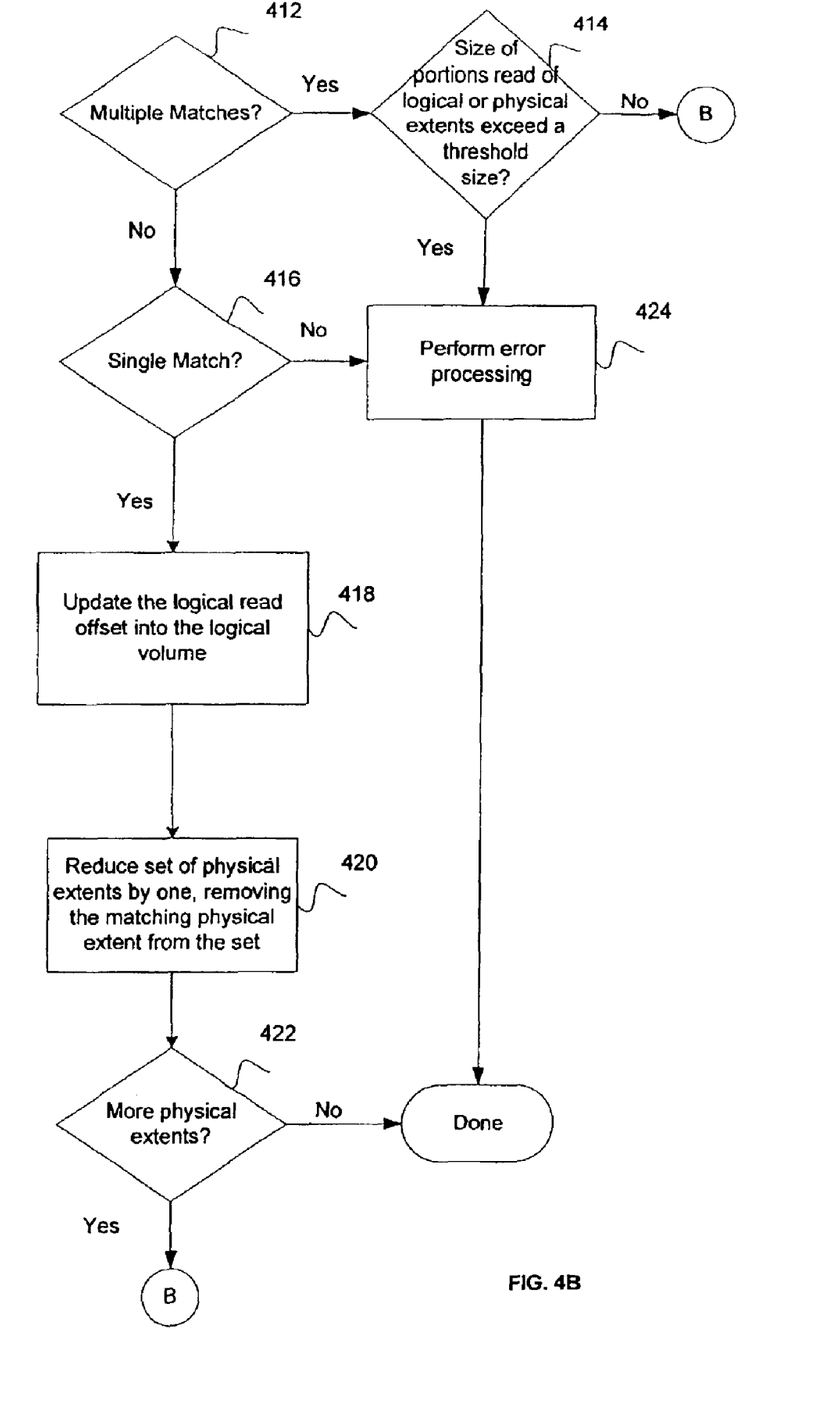

If a unique order of the physical extents cannot be determined, then a backup of the physical volume at the physical layer may not be possible without breaking the requirement that physical extents are backed up in logical order. Although the likelihood that the logic discussed in FIGS. 2A–2B would not be able to determine the ordering of the physical extents is very small, the likelihood may be further reduced by modifying the logic of FIGS. 2A–2B where information about which blocks in the logical volume are actually used (e.g., by a file system) is known. The logic of FIGS. 2A–2B is modified to treat portions of the logical volume as multiple logical extents, rather than treating the logical volume as a single logical extent. FIGS. 4A–4B illustrates the modifications to FIGS. 2A–2B.

FIGS. 4A–4B illustrate logic implemented in the volume mapper 140 to order physical extents mapped to multiple logical extents in a logical volume in accordance with certain implementations of the invention. Control begins at block 400 with the volume mapper 140 receiving a set of one or more physical extents for a logical volume in response to a request to the operating system 134 for the set of physical extents associated with the logical volume. In certain implementations of the invention, an initial physical extents structure 190 is used to store indicators to the physical extents in the order in which the physical extents were retrieved.

In block 402, the volume mapper 140 initializes a logical read offset to a logical start offset of the first logical extent. In certain implementations of the invention, the volume mapper 140 sets a pointer or equivalent means to point to or access the first byte of a first logical extent. In block 404, the volume mapper 140 initializes a physical read offset for each physical extent in the set of physical extents to its physical start offset plus the logical start offset of the logical extent minus the total length of already processed physical extents. In certain implementations of the invention, the volume mapper 140 sets additional pointers or equivalent means to point to or access a byte of each physical extent, respectively. In certain implementations of the invention, the logical volume includes multiple logical extents, and a current physical extent being processed maps to some location within the logical volume, corresponding to a portion of a logical extent, but not necessarily to the beginning of the logical volume. In the first iteration of processing blocks 404–422, the physical read offset for each physical extent in the set of physical extents is set to its physical start offset plus the logical start offset of the first logical extent. In other words, in the first iteration, the length of already processed physical extents is set to zero.

In block 406, the volume mapper 140 reads a portion (e.g., n bytes, where n represents an integer) of the logical extent, skipping ahead to the next used logical extent if needed. That is, logical extents are the used parts of the volume, and, for example, logical extent 1 may be used, then there may be a gap between logical extent 1 and logical extent 2, which is expressed by the difference of the start offset of logical extent 2 minus offset plus size of the logical extent 1. In block 408, the volume mapper 140 reads a portion (e.g., n bytes, where n represents an integer) of each physical extent. In block 410, the volume mapper 140 compares the portions read from each physical extent to the portion(s) read from the logical extent(s). The volume mapper 140 determines whether there are multiple matches (block 412). If there are multiple matches, processing continues to block 414, otherwise, processing continues to block 416.

In block 414, the volume mapper 140 determines whether the size of the read portions of the logical or physical extents exceeds a threshold size. Although the portion may be measured in various ways, in certain implementations of the invention, the portion is measured by bytes, and the threshold is set to a number of bytes less than the maximum length of each physical extent. If the size of the portions does not exceed the threshold size, processing continues to block 404. If the size of the portions exceeds the threshold size, then the physical extents cannot be ordered and a server free backup cannot be performed. In this situation, processing continues to block 424.

In block 424, error processing is performed. If a unique order of the physical extents cannot be determined by the volume mapper 140, then a backup of the physical volume may be performed using different backup techniques (such as, LAN-free or LAN-based backup).

In block 416, the volume mapper 140 determines whether a single match has been found based on the comparison of the portions of each physical extent with the portion of the logical volume (in block 410). If so, processing continues to block 418. If it is determined in block 416 that a single match does not exist, then the physical extents cannot be ordered and a server free backup cannot be performed. In this situation, the processing continues to block 424, where a backup of the logical volume may be performed using different backup techniques (such as, LAN-free or LAN-based backup).

Thus, processing loops through blocks 404 through 410, starting at the location at which the last read operation stopped, until there is a single match, the size of the portion to be compared exceeds the threshold size, or it is determined that there are no matches.

If there is a single match, the volume mapper 140 updates the logical read offset into the logical volume (block 418). In certain implementations, if a physical extent maps completely or in part to a portion of a logical extent, processing continues to match the remaining, unmapped portion of the logical extent, and processing continues to the next logical extent if a physical extent maps to one or more complete logical extents. In these implementations, volume mapper 140 updates the logical read offset into the logical volume by the length of the matching physical extent and skips all logical extents that fall into an area covered by the length of the matched physical extents. In particular, once a portion of a physical extent has been matched to a logical extent, the volume mapper obtains the size of the physical extent, and the volume mapper 140 then updates the logical read offset into the logical volume based on the obtained size of the matched physical extent. In certain alternative implementations of the invention, if a physical extent maps completely or in part to a portion of a logical extent, processing continues with the next complete logical extent. In these alternative implementations, the volume mapper 140 updates the logical read offset into the logical volume by the length of the matching physical extent and skips all logical extents that fall into an area covered by the length of the matched physical extents and all unused portions of the logical volume, if needed.

The volume mapper reduces the set of physical extents by one by removing the matching physical extent from the set of physical extents (block 420). In certain implementations of the invention, an indicator is added to a logically ordered physical extents structure 192 in the next available entry in the structure 192 representing the order of the matched physical extent. In block 422, the volume mapper 140 determines whether there any additional physical extents. If so processing returns to block 404, otherwise, processing is complete and the physical extents have been mapped to portions of the logical volume and put into logically ascending order using, for example, the logically ordered physical extents structure 192.

Figure 5:
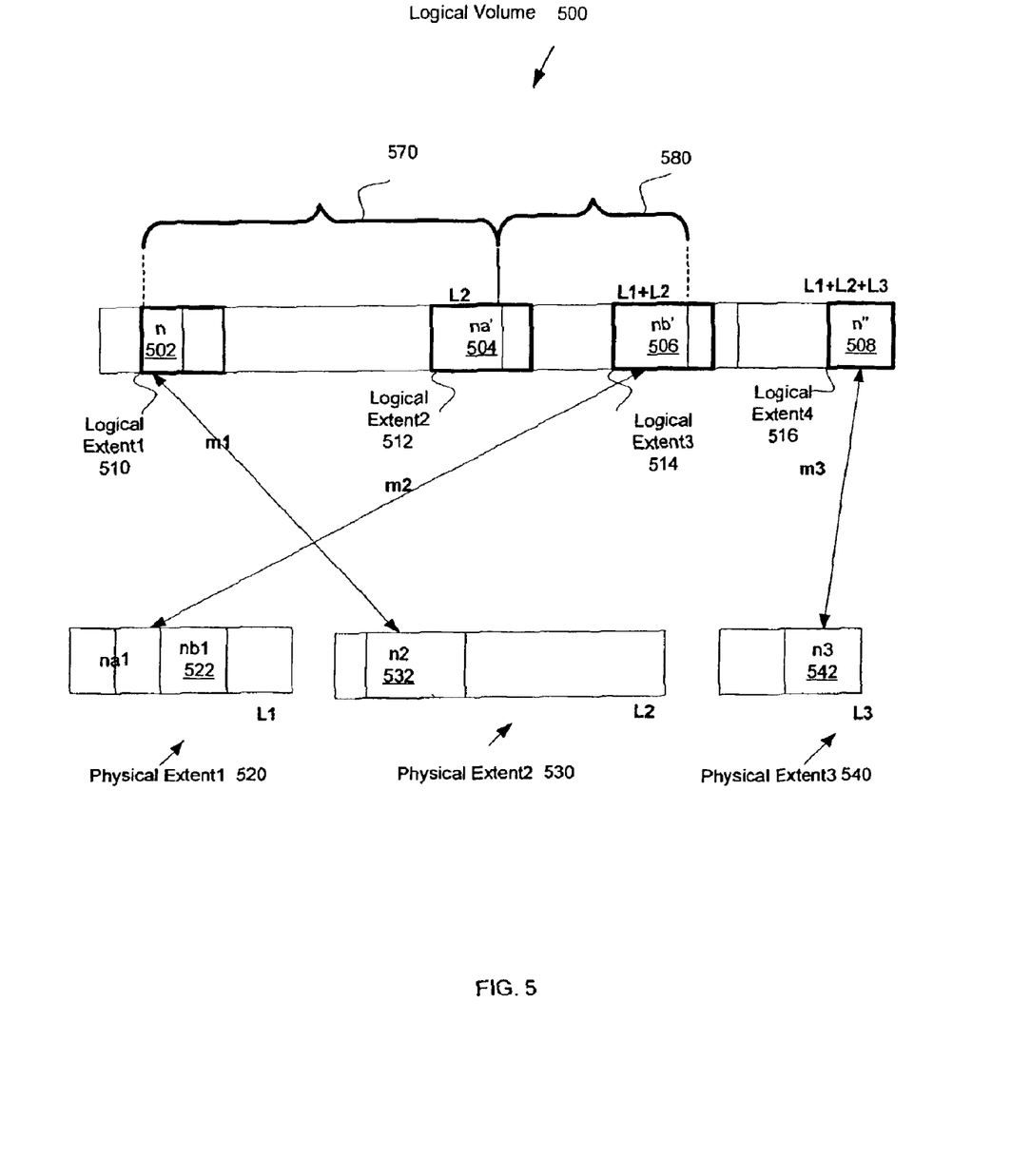
FIG. 5 illustrates multiple logical extents and multiple physical extents in accordance with certain implementations of the invention

FIG. 5 illustrates multiple logical extents and multiple physical extents in accordance with certain implementations of the invention. In FIG. 5, a single logical volume 500 has multiple logical extents, logical extent 1 (LE1) 510, logical extent (LE2) 512, logical extent 3 (LE3) 514, and logical extent 4 (LE4) 516. The volume mapper 140 maps the logical volume (i.e., logical extents 510, 512, 514, 516) to physical extents 520, physical extent 2 530, and physical extent 3 540. The physical extents 520, 530, 540 are ordered to reflect the correct mapping to the logical extents 510, 514, 516.

In the example illustrated in FIG. 5, a portion of logical extent 2 512 along with logical extent 1 510 (illustrated by bracket 570) maps to physical extent 2 530, and a portion of logical extent 2 512 along with logical extent 3 514 (illustrated by bracket 580) maps to physical extent 1 520. In certain implementations of the invention, in block 418, if a physical extent maps completely or in part to a portion of a logical extent, processing continues with the next complete logical extent. For example, in the example illustrated in FIG. 5, once the volume mapper 140 determines that a portion of logical extent 1 510 matches a portion of physical extent 2 530, the volume mapper obtains the size of physical extent 2 530, and determines an offset into the logical volume 500 based on the obtained size. In this example, the offset indicates that a portion of logical extent 2 512 also maps to physical extent 2 530, and the volume mapper 140 sets the logical read offset to the beginning of logical extent 3 514 (skipping the remaining unmatched portion of logical extent 2 512). In this example, the volume mapper 140 then matches a portion of logical extent 3 514 with portions of remaining physical extents.

In certain alternative implementations, if the offset indicated that a portion of logical extent 2 512 also mapped to physical extent 2 530, the volume mapper 140 would set the logical read offset to the beginning of the unmatched portion of logical extent 2 512 and match a portion of logical extent 2 512 with portions of remaining physical extents.

In FIG. 5, the sizes of portions read from the logical volume 500 in the first, second, and third iterations of processing in blocks 404–422 of FIGS. 4A–4B are represented with n 502, nb' 506, and n" 508, respectively. The portion of size na' 504 represents the portion of logical extent 2 512 that, along with logical extent 1 51 0, maps to physical extent 2 530. The sizes of portions read from each of the physical extents 520, 530, 540 are represented with nb1 522, n2 532, and n3 542, respectively. The portion of size na1 is skipped in physical extent 1 520 because the physical read offset is set to the physical start offset plus the logical start offset of logical extent 3 514. The length of each physical extent 520, 530, 540 is represented with L1, L2, and L3, respectively. The lines marked m1, m2, and m3 represent matches between logical extents 510, 514, 516 of logical volume 500 and each physical extent 520, 530, 540 in the first, second, and third iterations of processing in blocks 404–422 of FIGS. 4A–4B.

For example, in the first iteration, a portion of size n 502 of logical is read from the logical volume 500 and is found to match physical extent 2 540. In the second iteration, portion of size nb' 506 is read from the logical volume 500 and is found to match physical extent 520. In the third iteration, portion of size n" 506 is read from the logical volume 506 and is found to match physical extent 550. The ordering of the physical extents returned by the volume mapper 140 is: physical extent 2 530, physical extent 1 520, and physical extent 3 540. Thus, the physical extents 520, 540, 530 are logically ordered to match the ordering of logical extents 510, 514, 516. The volume mapper 140 returns the ordered physical extents to the client software 136, which sends the ordered physical extents to server software at the server computer 120, which then sends a command to the gateway 152 that includes the ordered physical extents to perform a server-free copy operation.

In summary, implementations of the invention provide the capability to perform data movement operations on a physical level, such as a server-free backup, without requiring that the mapping between logical and physical extents be externalized (e.g., by a Logical Volume Manager). Additionally, implementations of the invention are applicable when multiple non-contiguous logical extents are mapped, for example, in the case in which only the used blocks of a file system are to be backed up using server-free backup.

Additional Implementation Details

The described techniques for ordering of physical extents may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 2A–2B and 4A–4B describe specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel, or operations described as performed by a single process may be performed by distributed processes.

The illustrated logic of FIGS. 2A–2B and 4A–4B was described as being implemented in software. The logic may be implemented in hardware or in programmable and non-programmable gate array logic.

Figure 6:
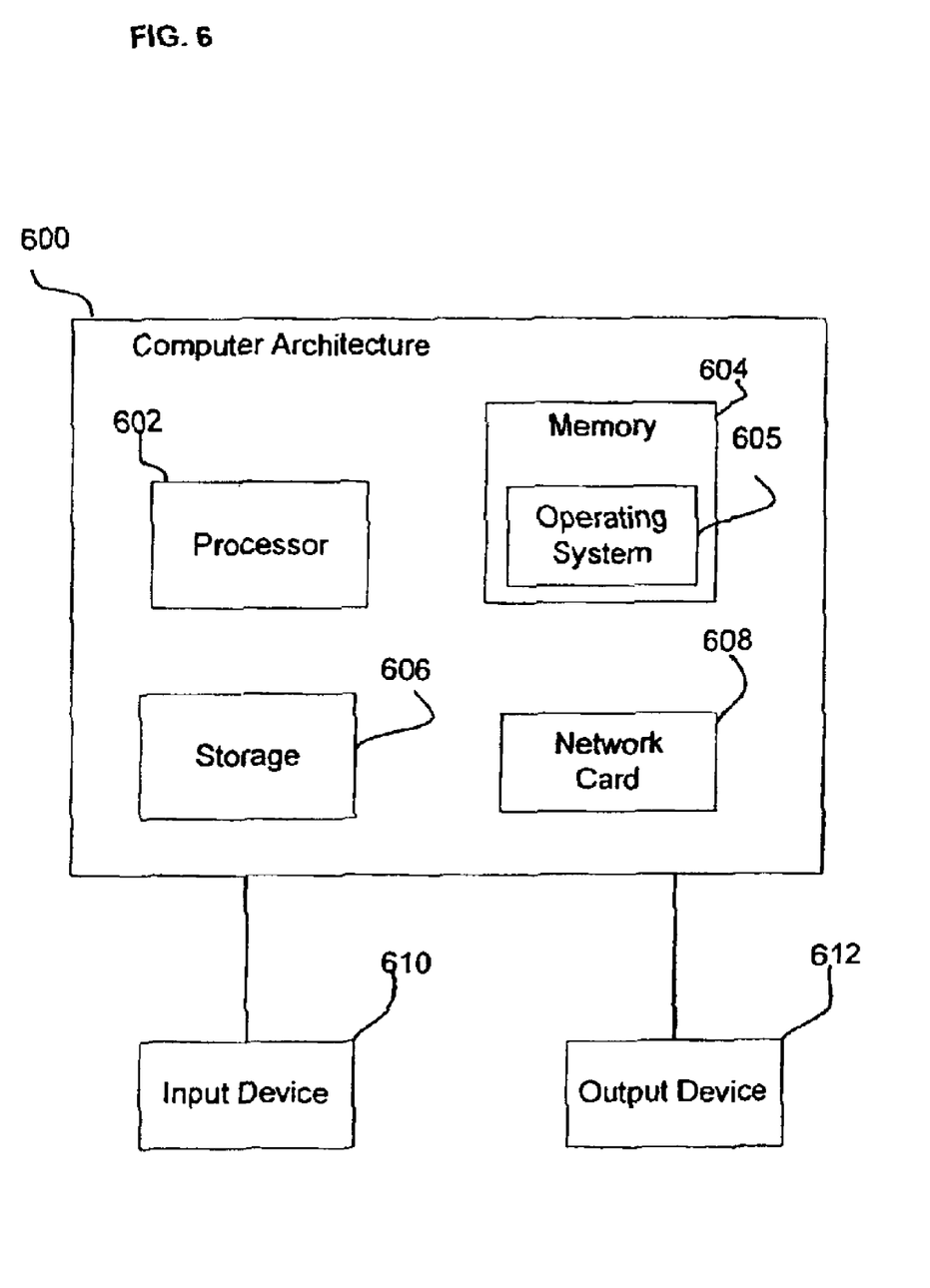
FIG. 6 illustrates one implementation of the architecture of the computer system of FIG. 1A in accordance with certain implementations of the invention

FIG. 6 illustrates one implementation of the architecture of computer 10 and/or 120 in accordance with certain implementations of the invention. The computer architecture 600 has a processor 602 (e.g., a microprocessor), a memory 604 (e.g., a volatile memory device), and storage 606 (e.g., a non-volatile storage area, such as magnetic disk drives, optical disk drives, a tape drive, etc.). An operating system 605 may execute in memory 604. The storage 606 may comprise an internal storage device or an attached or network accessible storage. Programs in the storage 606 are loaded into the memory 604 and executed by the processor 602 in a manner known in the art. The architecture further includes a network card 608 to enable communication with a network. An input device 610 is used to provide user input to the processor 602, and may include a keyboard, mouse, pen-stylus, microphone, touch sensitive display screen, or any other activation or input mechanism known in the art. An output device 612 is capable of rendering information transmitted from the processor 602, or other component, such as a display monitor, printer, storage, etc.

The computer 600 may comprise any computing device known in the art, such as a mainframe, server, personal computer, workstation, laptop, handheld computer, telephony device, network appliance, virtualization device, storage controller, etc. Any processor 602 and operating system 605 known in the art may be used.

The foregoing description of the preferred implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method of ordering data, comprising:
    initializing a logical read offset to a logical start offset of a next complete logical extent from a plurality of logical extents;
    matching portions of a logical volume with portions of the one or more physical extents, wherein the logical volume comprises the plurality of logical extents; and
    ordering the one or more physical extents according to the order of the matched portions of the logical volume.

2. The method of claim 1, further comprising: retrieving physical extents for the logical volume.

3. The method of claim 1, wherein the logical volume comprises a single logical extent.

4. The method of claim 3, further comprising:
    initializing a physical read offset for each physical extent to a physical start offset.

5. A method of ordering data comprising:
    initializing a logical read offset to a logical start offset of an unmapped portion of a logical extent from a plurality of logical extents;
    matching portions of a logical volume with portions of one more physical extents, wherein the logical volume comprises the plurality of logical extents; and
    ordering the one or more physical extents according to the order of the matched portions of the logical volume.

6. A method of ordering data, comprising:
    initializing a physical read offset for each physical extent to a physical start offset of that physical extent plus a logical start offset of one of a plurality of logical extents;
    matching portions of a logical volume with portions of one or more physical extents, wherein logical volume comprises the plurality of logical extents; and
    ordering the one or more physical extents according to the order of the matched portions of the logical volume.

7. A method of ordering data, comprising:
    matching portions of a logical volume with portions of one or more physical extents by attempting to match a portion of the logical volume with portions of each of the one or more physical extents until a size of the portion of the logical volume to be compared meets a threshold size; and
    ordering the one or more physical extents according to the order of the matched portions of the logical volume.

8. The method of claim 7, wherein the logical volume comprises a plurality of logical extents.

9. A method of ordering data, comprising:
    matching portions of a logical volume with portions of one or more physical extents by attempting to match a portion of the logical volume with portions of each of the one or more physical extents until a size of a portion of at least one physical extent to be compared meets a threshold size; and
    ordering the one or more physical extents according to the order of the matched portions of the logical volume.

10. A method of ordering data, comprising:
    matching portions of a logical volume with portions of one or more physical extents, wherein the matching indicates that a portion of the logical volume matches one of the physical extents and further comprising:
    updating a logical read offset; and
    reducing a number of physical extents to be matched to the logical volume; and ordering the one or more physical extents according to the order of the matched portions of the logical volume.

11. A system of ordering data, comprising:
means for initializing a logical read offset to a logical start offset of a next complete logical extent from a plurality of logical extents;
means for matching portions of a logical volume with portions of one or more physical extents, wherein the logical volume comprises the plurality of logical extents; and
means for ordering the one or more physical extents according to the order of the matched portions of the logical volume.

12. The system of claim 11, further comprising:
means for retrieving physical extents for the logical volume.

13. The system of claim 11, wherein the logical volume comprises a single logical extent.

14. The system of claim 13, further comprising:
means for initializing a physical read offset for each physical extent to a physical start offset.

15. A system of ordering data, comprising:
means for initializing a logical read offset to a logical start offset of an unmapped portion of a logical extent from a plurality of logical extents;
means for matching portions of a logical volume with portions of one or more physical extents, wherein the logical volume comprises the plurality of logical extents; and
means for ordering the one or more physical extents according the order of the matched portions of the logical volume.

16. A system of ordering data, comprising:
means for initializing the physical read offset for each physical extent to a physical start offset of that physical extent plus a logical start offset of one of a plurality of logical extents;
means for matching portions of a logical volume with portions of one or more physical extents, wherein the logical volume comprises the plurality of logical extents; and
means for ordering the one or more physical extents according to the order of the matched portions of the logical volume.

17. A system of ordering data, comprising:
means for matching portions of a logical volume with portions of one or more physical extents, including means for attempting to match a portion of the logical volume with portions of each of the one or more physical extents until a size of the portion of the logical volume to be compared meets a threshold size; and
means for ordering the one or more physical extents according to the order of the matched portions of the logical volume.

18. The system of claim 17, wherein the logical volume comprises a plurality of logical extents.

19. A system of ordering data, comprising:
means for matching portions of a logical volume with portions of one or more physical extents, including means for attempting to match a portion of the logical volume with portions of each of the one or more physical extents until a size of a portion of at least one physical extent to be compared meets a threshold size; and
means for ordering the one or more physical extents according to the order of the matched portions of the logical volume.

20. A system of ordering data, comprising:
means for matching portions of a logical volume with portions of one or more physical extents, wherein the matching indicates that a portion of the logical volume matches one of the physical extents, and further comprising:
means for updating a logical read offset; and
means for reducing a number of physical extents according to the order of the matched portions of the logical volume.

21. An article of manufacture embodied as a computer readable medium encoded with instructions for ordering data, wherein the instructions cause operations to be performed, the operations comprising:
initializing a logical read offset to a logical start offset of a next complete logical extent from a plurality of logical extents;
matching portions of a logical volume with portions of one or more physical extents, wherein the logical volume comprises the plurality of logical extents; and
ordering the one or more physical extents according to the order of the matched portions of the logical volume.

22. The article of manufacture of claim 21, the operations further comprising:
retrieving physical extents for the logical volume.

23. The article of manufacture of claim 21, wherein the logical volume comprises a single logical extent.

24. The article of manufacture of claim 23, the operations further comprising:
initializing a physical read offset for each physical extent to a physical start offset.

25. An article of manufacture embodied as a computer readable medium encoded with instructions for ordering data, wherein the instructions cause operations to be performed, the operations comprising:
initializing a logical read offset to a logical start offset of an unmapped portion of a logical extent from a plurality of logical extents;
matching portions of a logical volume with portions of one or more physical extents, wherein the logical volume comprises the plurality of logical extents; and
ordering the one or more physical extents according to the order of the matched portions of the logical volume.

26. An article of manufacture embodied as a computer readable medium encoded with instructions for ordering data, wherein the instructions cause operations to be performed, the operations comprising;
initializing the physical read offset for each physical extent to a physical start offset of that physical extent plus a logical start offset of one of a plurality of logical extents;
matching portions of a logical volume with portions of one or more physical extents, wherein the logical volume comprises the plurality of logical extents; and
ordering the one or more physical extents according to the order of the matched portions of the logical volume.

27. An article of manufacture embodied as a computer readable medium encoded with instructions for ordering data, wherein the instructions cause operations to be performed, the operations comprising:
matching portions a logical volume with portions of one or more physical extents by attempting to match a portion of the logical volume with portions of each of the one or more physical extents until a size of the portion of the logical volume to be compared meets a threshold size; and ordering the one or more physical extents according to the order of the matched portions of the logical volume.

28. The article of manufacture of claim 27, wherein the logical volume comprises a plurality of logical extents.

29. An article of manufacture embodied as a computer readable medium encoded with instructions for ordering data, wherein the instructions cause operations to be performed, the operations comprising:

matching portions of a logical volume with portions of one or more physical extents by attempting to match a portion of the logical volume with portions of each of the one or more physical extents until a size of a portion of at least one physical extent to be compared meets a threshold size; and ordering the one or more physical extents according to the order of the matched portions of the logical volume.

30. An article of manufacture embodied as a computer readable medium encoded with instructions for ordering data, wherein the instructions cause operations to be performed, the operations comprising:

matching portions of a logical volume with portions of one or more physical extents, wherein the matching indicates that a portion of the logical volume matches one of the physical extent, and the operations further comprising:

updating a logical read offset; and reducing a number of physical extents to be matched to the logical volume; and ordering the one or more physical extents according to the order of the matched portions of the logical volume.

* * * * *